United States Patent
Tang et al.

(10) Patent No.: US 7,825,757 B2
(45) Date of Patent: Nov. 2, 2010

(54) ELECTRONIC DEVICE WITH LATCH

(75) Inventors: Jia-He Tang, Shenzhen (CN);
Wen-Haw Tseng, Taipei Hsien (TW);
Shih-Fang Wong, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 154 days.

(21) Appl. No.: 12/248,001

(22) Filed: Oct. 8, 2008

(65) Prior Publication Data

US 2009/0231071 A1    Sep. 17, 2009

(30) Foreign Application Priority Data

Mar. 11, 2008    (CN) .................. 2008 1 0300524

(51) Int. Cl.
*H01H 9/00* (2006.01)

(52) U.S. Cl. .................. 335/205; 24/303; 292/251.5

(58) Field of Classification Search ......... 335/205–207; 24/303; 345/179; 292/251.5
See application file for complete search history.

(56) References Cited

U.S. PATENT DOCUMENTS

| | | | |
|---|---|---|---|
| 5,559,670 A * | 9/1996 | Flint et al. ............. | 361/679.06 |
| 5,921,382 A | 7/1999 | Retter | |
| 6,653,919 B2 * | 11/2003 | Shih-Chung et al. ........ | 335/207 |
| 7,277,086 B2 * | 10/2007 | Sugihara ..................... | 345/169 |
| 7,428,142 B1 * | 9/2008 | Ligtenberg et al. ..... | 361/679.55 |
| 7,583,500 B2 * | 9/2009 | Ligtenberg et al. .......... | 361/147 |
| 2004/0100457 A1 * | 5/2004 | Mandle ...................... | 345/179 |
| 2008/0278269 A1 * | 11/2008 | Ramirez et al. ............. | 335/205 |
| 2009/0058578 A1 * | 3/2009 | Huang ........................ | 335/205 |

* cited by examiner

*Primary Examiner*—Elvin G Enad
*Assistant Examiner*—Bernard Rojas
(74) *Attorney, Agent, or Firm*—Clifford O. Chi

(57) ABSTRACT

An electronic device includes a main body and a cover pivotally assembled on the main body, wherein when the cover rotates relative to the main body, the electronic device is automatically powered on.

20 Claims, 5 Drawing Sheets

ELECTRONIC DEVICE WITH LATCH

BACKGROUND

1. Field of the Disclosure

The present disclosure generally relates to electronic devices, and particularly, to an electronic device with a latch.

2. Description of Related Art

Electronic devices, such as laptops, usually includes a main body and a cover pivotally assembled to the main body. The main body includes a lock and a power switch. The cover is arranged with a hook corresponding to the lock. The power switch is used for powering on/off the electronic device.

When the main body and the cover are folded together, the hook is forced to disengage from the lock, and the cover may then be pivotably rotated from the main body. The power switch which may have been unreachable when the cover was folded to the main body can now be pressed by the user to power on the electronic device.

This is an inconvenience because several actions such as opening the cover and pressing down the power switch should be performed by the user before the electronic device can be powered up.

Therefore, a new and improved electronic device is desired to overcome the above-described shortcomings.

SUMMARY

An electronic device comprising: a main body including a printed circuit board, a cover body pivotally assembled to the main body, and an active member. The cover body being selectively located in a closed position, at which the cover body covers the main body, and an open position at which the cover pivotally rotates away from the main body. The active member automatically power on the electronic device when the cover body is in the open position. The active member comprising: a first driving portion mounted to the cover body, a second driving portion mounted to the main body, a power switch mounted on the printed circuit board. When the cover body is in the closed position, an attraction force is generated by the cooperation of the first and second driving portion, and the power switch power off the electronic device. When the cover body rotates from the closed position to the open position, the attraction force activates the power switch to power on the electronic device.

Other systems, methods, features, and advantages of the present electronic device will be or become apparent to one with skill in the art upon examination of the following drawings and detailed description. It is intended that all such additional systems, methods, features, and advantages be included within this description, be within the scope of the present apparatus, and be protected by the accompanying claims.

BRIEF DESCRIPTION OF THE DRAWINGS

Many aspects of the present electronic device can be better understood with reference to the following drawings. The components in the drawings are not necessarily to scale, emphasis instead being placed upon clearly illustrating the principles of the present device. Moreover, in the drawings, like reference numerals designate corresponding parts throughout the several views.

DETAILED DESCRIPTION

Figure 1:
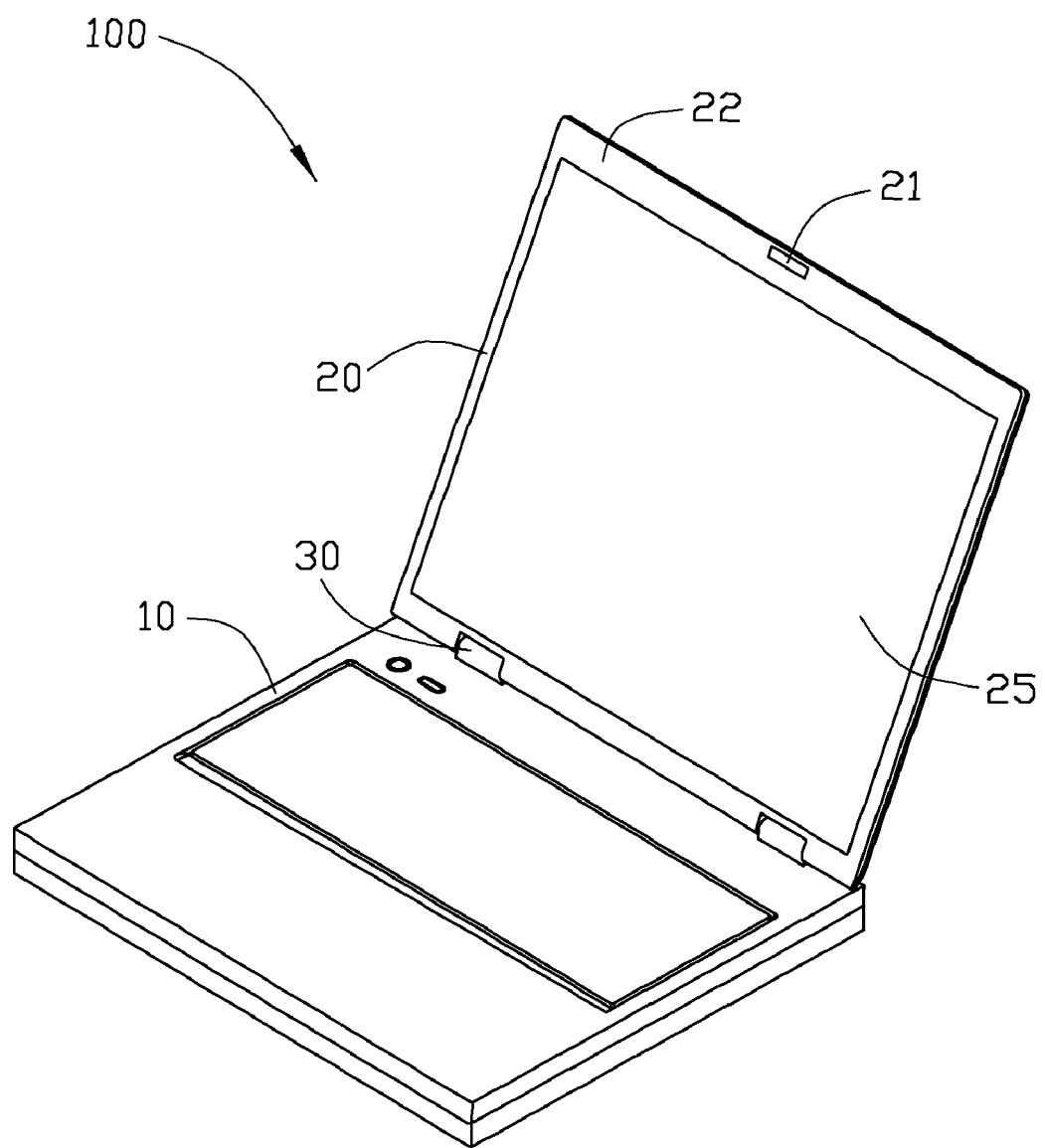
FIG. 1 is an isometric view of an electronic device in an opened position in accordance with an exemplary embodiment, the electronic device including a main body.

Reference will now be made to the drawings to describe the exemplary embodiments of the present electronic device, in detail.

Referring to FIGS. 1 to 5, an electronic device 100 includes a main body 10, a cover body 20, a pivot 30, and an active member 40. The cover body 20 is assembled to the main body 10 by the pivot 30, and is rotatable relative to the main body 10 about the pivot 30 from an open position to a closed position, or vice versa. The active member 40 is used for locking/unlocking the cover body 20 to/from the main body 10 and powering on the electronic device 100.

Figure 2:
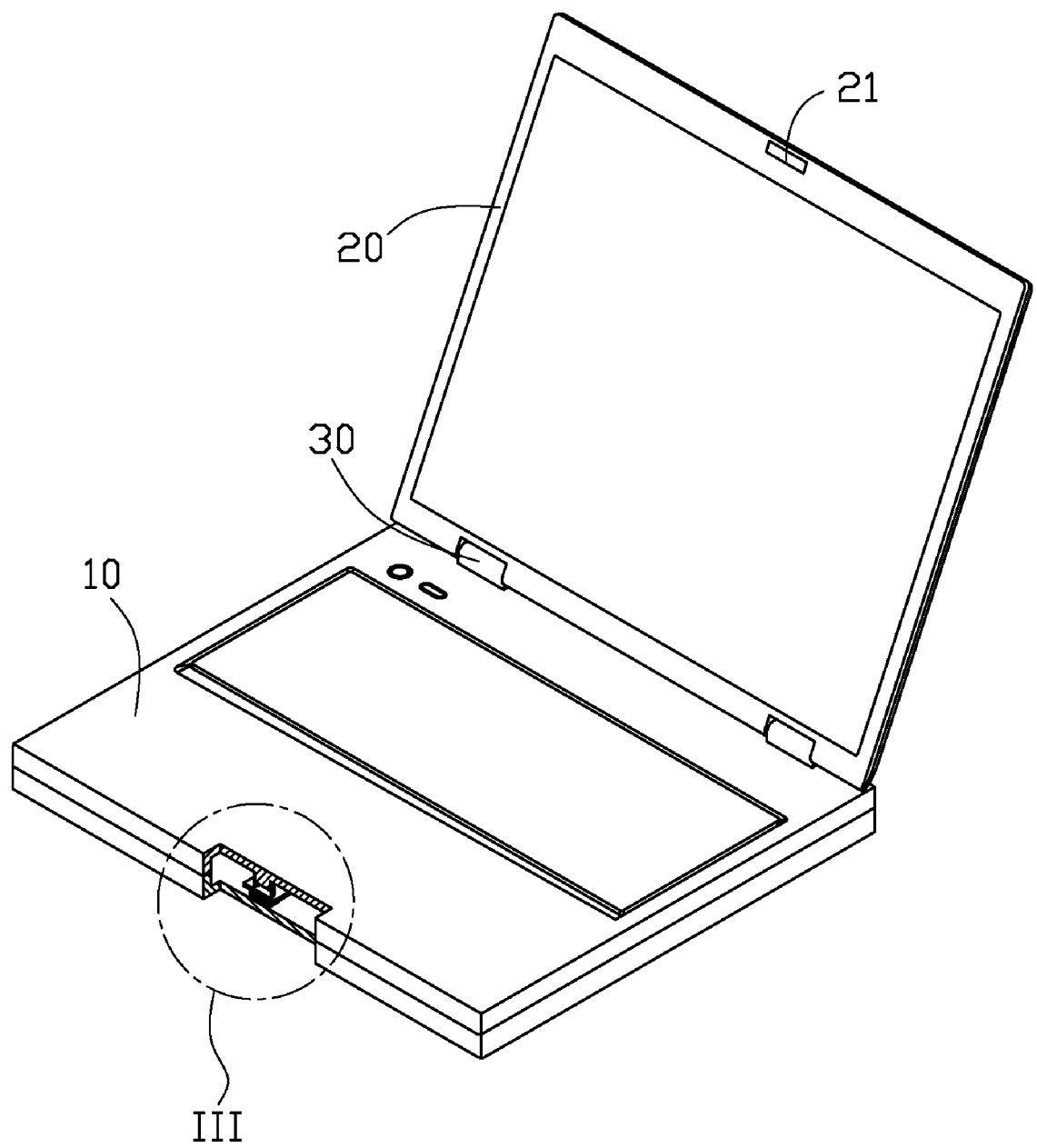
FIG. 2 is a cross-sectional view of a part III of the main body of the electronic device of FIG. 1 in the opened position.
Figure 3:
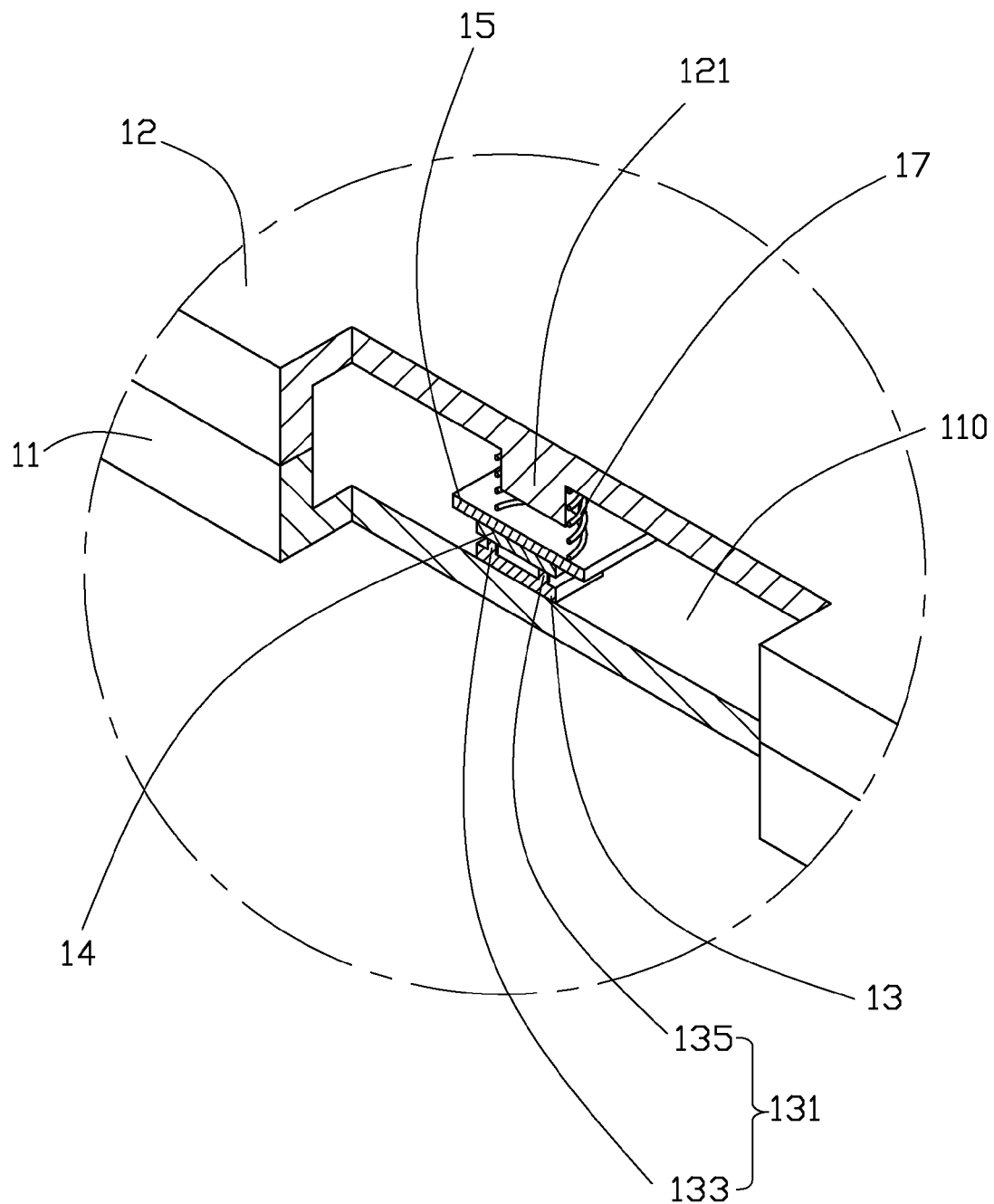
FIG. 3 is an enlarged view of the part III of the main body of FIG. 2.

Referring to FIGS. 2 and 3, the cover body 20 includes an inner surface 22 facing the main body 10 and a screen 25 in the inner surface 22. The screen 25 is used for displaying information when the cover body 20 is in the open position. The main body 10 includes a first housing 11, a second housing 12 cooperatively combined with the first housing 11 to define a receiving space 110 for accommodating various electronic components, such as one or more central processing units (CPU), a printed circuit board 13 or a rechargeable battery. A positioning post 121 protrudes downwardly from an inner surface of a top wall of the second housing 12.

Figure 5:
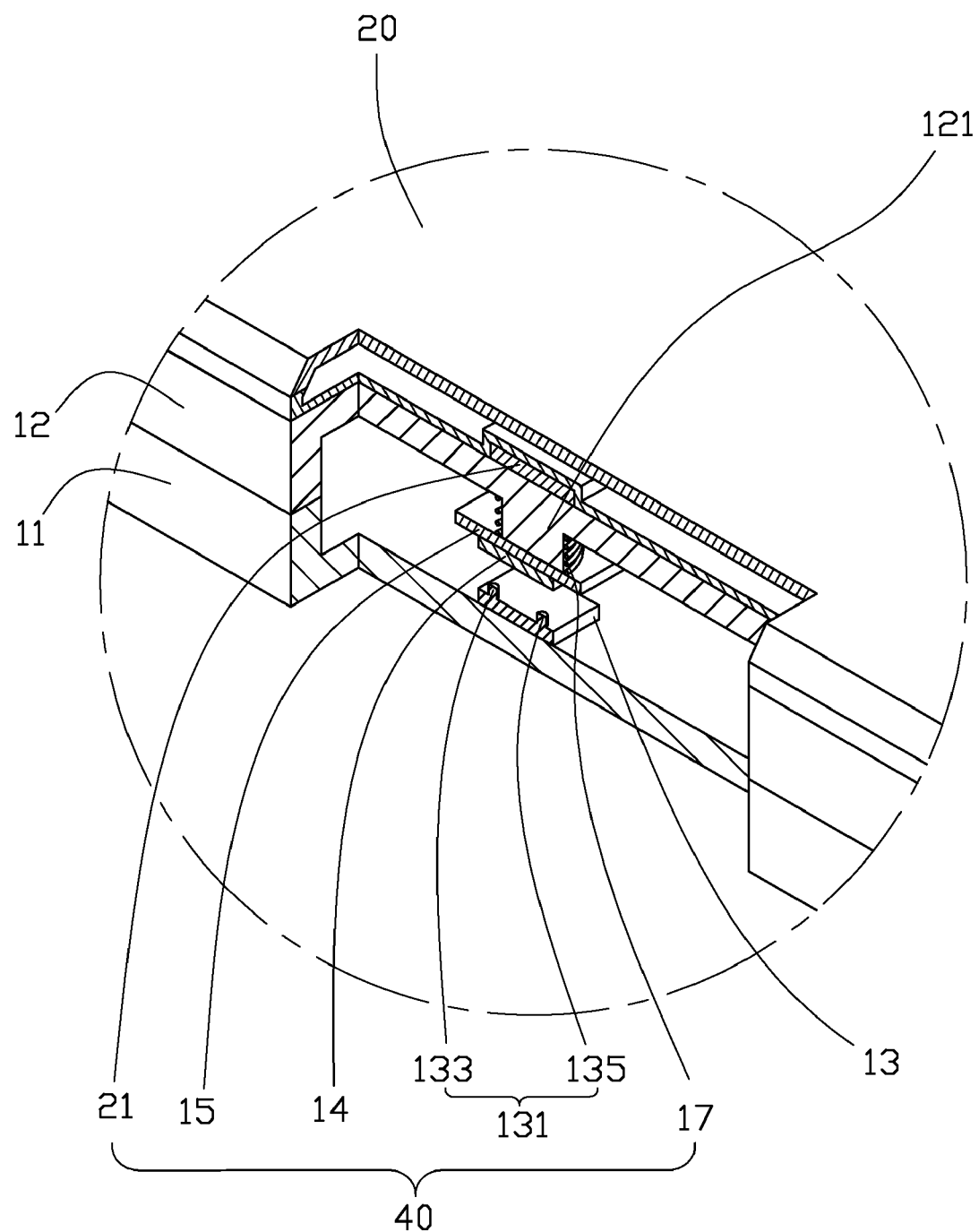
FIG. 5 is an enlarged view of the part V of the electronic device of FIG. 4.

Referring to FIG. 5, the active member 40 includes a first driving portion 21 disposed on the cover body 20. A second driving portion 15, an elastic member 17, a power switch 131, and a conductive member 14 disposed in the main body 10. The first driving portion 21 and the second driving portion 15 are attracted to each other. In the exemplary embodiment, the first driving portion 21 and the second driving portion 15 are magnets. In other embodiment, one of the first driving portion 21 or the second driving portion 15 may be iron or steel instead of pre-magnetized material.

The first driving portion 21 is disposed on a front edge of the inner surface 22 of the cover body 20, and opposite to the positioning post 121 of the main body 10 when the cover body 20 is located in the closed position.

The power switch 131 is disposed on the printed circuit board 13. The power switch 131 includes a first contact 133 and a second contact 135. The two contacts 133, 135 protrudes upwardly from the printed circuit board 13 and opposite to the positioning post 121.

The conductive member 14 is located above the first contact 133 and the second contact 135. The second driving portion 15 is secured with the conductive member 14 and is larger than the conductive member 14. The conductive portion 14 is capable of being driven to move together with the second driving portion 15. The conductive portion 14 selectively presses against the power switch 131 to control the power switch 131. When the conductive portion 14 presses against the power switch 131, the conductive portion 14 electrically connects the first contact 133 with the second contact 135, thus the power switch 131 is closed. As such, the associated power circuitry for supplying power to the electrical device 100 power on the electrical device 100. When the conductive portion 14 is not in contact with the power switch 131, the first contact 133 and the second contact 135 are not electrically connected to each other and the power switch 131 is opened. As such, the power circuitry associated with the power switch 131 is opened and no power is supplied to the electrical device 100.

The elastic member 17 is disposed between the second driving portion 15 and the first driving portion 21, and is sleeved around the positioning post 121. In the exemplary embodiment, the elastic member 17 is a compression spring. When the cover body 20 is in the closed position, the elastic member 17 is compressed by the attraction force between the second driving portion 15 and the first driving portion 21. When the cover body 20 rotates from the closed position to the open position, the first driving portion 21 moves away from the second driving portion 15 and the potential energy stored in the compressed elastic member 17 is released. This release of potential energy results in the elastic member 17 expanding along the longitudinal direction of the positioning post 121, which in turn pushes the second driving portion 15 and the conductive portion 14 to contact the first contact 133 and the second contact 135 of the power switch 131 thereby turning the electrical device 100 on. In other embodiment, the elastic member 17 may be an elastic gasket.

During assembly, the printed circuit board 13 is fixed on the first housing 11; the conductive portion 14 is fixed to the second driving portion 15; and the elastic member 17 is sleeved around the positioning post 121. Then, the conductive portion 14 and the second driving portion 15 are disposed between the elastic member 17 and the power switch 131, the conductive portion 14 is disposed adjacent to the power switch 131, and the second driving portion 15 is disposed at a side near the elastic member 17. Finally, the first driving portion 21 is fixed on the inner surface 22 of the cover 20, and the position of the second driving portion 15 is opposite to the position of the first driving portion 21.

Figure 4:
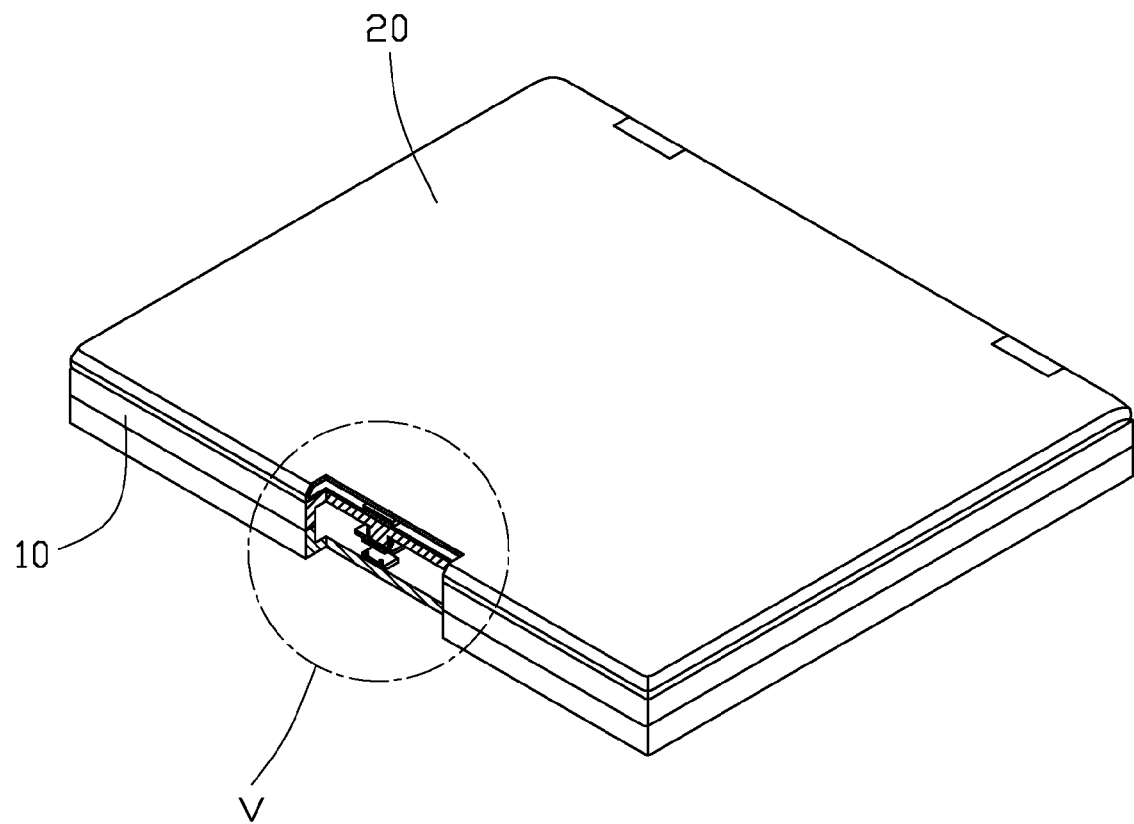
FIG. 4 is a cross-sectional view of a part V of the electronic device of FIG. 1 in a closed position.

Referring to FIGS. 4 and 5, when the cover body 20 is located at the closed position, the cover body 20 is folded onto the main body 10. The second driving portion 15 is attracted by the first driving portion 21 to move toward the positioning post 121, and the elastic member 17 is compressed by the second driving portion 15 to store potential energy. Thus, the cover body 20 is locked on the main body 10 by the attraction force. The conductive portion 14 fixed to the second driving portion 15 is brought to move apart from the first contact 133 and second contact 135, causing the power switch 131 to be opened. When a force is applied on the cover body 20 to rotate away from the main body 10, the first driving portion 21 is separates from the second driving portion 15 so that the attraction force between the two driving portions 15, 21 is reduced. When the attraction force is smaller than the potential energy stored in the elastic member 17, the second driving portion 15 moves toward the power switch 131, causing the conductive portion 14 to contact the first contact 133 and the second contact 135. In this case, the power switch 131 is closed.

As described above, when the electronic device 100 is in use, the electronic device 100 is automatically powered on. Therefore, it is very convenience for users.

The embodiments described herein are merely illustrative of the principles of the present disclosure. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

What is claimed is:

1. An electronic device comprising:
   a main body including a printed circuit board,
   a cover body pivotally assembled to the main body, the cover body being selectively located in a closed position, at which the cover body covers the main body, and an open position at which the cover rotates away the main body, and
   an active member automatically powering on the electronic device when the cover body is rotated to the open position, the active member comprising:
   a first driving portion mounted to the cover body;
   a second driving portion mounted to the main body;
   a power switch mounted on the printed circuit board;
   wherein, when the cover body locates in the closed position, an attraction force is generated by the cooperation of the first and second driving portion, and the power switch is activated by the attraction force to power off the electronic device, when the cover body rotates from the closed position to the open position, the attraction force is reduced to activate the power switch to power on the electronic device.

2. The electronic device of claim 1, wherein the active member further comprises an elastic member between the first and second driving portions, the elastic member is compressed by the attraction force to store potential energy when the second driving portion is attracted by the first driving portion and activates the power switch by the expansion of the elastic member due to the reduced attraction force when the cover body rotates from the closed position to the open position.

3. The electronic device of claim 2, wherein the active member further comprises a conductive portion, the conductive portion is driven by the elastic member to touch the power switch and influenced by the attraction force to move away from the power switch.

4. The electronic device of claim 3, wherein the first driving portion and the second driving portion are magnets.

5. The electronic device of claim 3, wherein the main body comprising:
   a first housing;
   a second housing cooperatively combined with the first housing to define a receiving space; and
   the second driving portion, the power switch, the printed circuit board and the elastic member accommodated in the receiving space.

6. The electronic device of claim 5, wherein the main body further comprises a positioning post, the positioning post protrudes downwardly from an inner surface of a top of the second housing, and the elastic member is sleeved around the positioning post.

7. The electronic device of claim 6, wherein the power switch includes a first contact and a second contact, the first contact and the second contact protrudes from the printed circuit board.

8. The electronic device of claim 3, wherein one of the first driving portion and the second driving portion is magnet and the other of the first driving portion and the second driving portion is iron or steel.

9. An electronic device comprising:
   a main body including a printed circuit board;
   a cover body mounted on the main body, the cover body is selectively located in a closed position and an open position;
   an active member for locking the cover body on the main body when the cover body is in the closed position and unlocking the cover body from the main body and automatically powering on the electronic device when the cover body moves from the closed position to the open position, the active member comprising a first driving portion mounted in the cover body, a second driving portion mounted in the main body and being capable of cooperating with the first driving portion; a power switch electrical coupled to the printed circuit board;

wherein, when the cover body is in the closed position, the first driving portion cooperates with the second driving portion to generate an attraction force to lock the cover body on the main body and to power off the electronic device, when the cover body goes from the closed position to the open position, the attraction force generated by the cooperation between the first driving portion and second driving portion is reduced so as to unlock the cover body from the main body and to automatically activate the power switch.

10. The electronic device of claim 9, wherein the active member further comprises an elastic member between the first and second driving portions, the elastic member is compressed by the attraction force to store potential energy when the second driving portion is attracted by the first driving portion and activates the power switch by the expansion of the elastic member due to the reduced attraction force when the cover body rotates from the closed position to the open position.

11. The electronic device of claim 10, wherein the active member further comprises a conductive portion, the conductive portion is driven by the elastic member to touch the power switch and influenced by the attraction force to move away from the power switch.

12. The electronic device of claim 11, wherein the first driving portion and the second driving portion are magnets.

13. The electronic device of claim 11, wherein the main body comprising:
a first housing;
a second housing cooperatively combined with the first housing to define a receiving space; and
the second driving portion, the power switch, the printed circuit board and the elastic member accommodated in the receiving space.

14. The electronic device of claim 13, wherein the main body further comprises a positioning post, the positioning post protrudes downwardly from an inner surface of a top of the second housing, and the elastic member is sleeved around the positioning post.

15. The electronic device of claim 14, wherein the main body further comprises a conductive portion, the conductive portion is disposed between the second driving portion and the power switch; the conductive portion is capable of being driven to move together with the second driving portion, by the potential energy, for selectively engaging with or disengaging from the power switch to control the power switch opening or closing.

16. The electronic device of claim 15, wherein the power switch includes a first contact and a second contact, the first contact and the second contact protrudes from the printed circuit board.

17. The electronic device of claim 11, wherein one of the first driving portion and the second driving portion is magnet and the other of the first driving portion and the second driving portion is iron or steel.

18. An electronic device comprising:
a main body including a printed circuit board,
a cover body pivotally assembled to the main body, the cover body being selectively located in a closed position, at which the cover body covers the main body, and an open position at which the cover rotates away the main body, and
an active member automatically powering on the electronic device when the cover body is rotated to the open position, the active member comprising:
a first driving portion mounted to the cover body;
a second driving portion, a conductive portion, a first contact, and a second contact disposed on the printed circuit board are accommodated in the main body;
the conductive portion being disposed between the second driving portion, and the first contact and the second contact;
wherein, when the cover body locates in the closed position, an attraction force is generated by the cooperation of the first and second driving portion, the second driving portion is driven by attraction force to bring the conductive portion to move apart from the first contact and second contact for power off the electronic device, when the cover body rotates from the closed position to the open position, the attraction force is reduced to activate the conductive portion to contact the first contact and the second contact for power on the electronic device.

19. The electronic device of claim 18, wherein the first driving portion and the second driving portion are magnets.

20. The electronic device of claim 19, wherein the active member further comprises an elastic member between the first and second driving portions, the elastic member is compressed by the attraction force to store potential energy when the second driving portion is attracted by the first driving portion and activates the power switch by the expansion of the elastic member due to the reduced attraction force when the cover body rotates from the closed position to the open position.

* * * * *